United States Patent [19]

Harman

[11] Patent Number: 4,853,460

[45] Date of Patent: Aug. 1, 1989

[54] LONG OPEN ASSEMBLY TIME VINYL-BONDING POLYAMIDE FROM DIMER ACID

[75] Inventor: Nancy W. Harman, Savannah, Ga.

[73] Assignee: Union Camp Corporation, Wayne, N.J.

[21] Appl. No.: 173,331

[22] Filed: Mar. 24, 1988

[51] Int. Cl.[4] .............................................. C08G 69/34
[52] U.S. Cl. ................................. 528/339.3; 528/338; 528/339; 528/340; 528/341
[58] Field of Search .............................. 528/338, 339.3

[56] References Cited

U.S. PATENT DOCUMENTS 4,652,327  3/1987  Hayes et al. ..................... 528/339.3

Primary Examiner—Harold D. Anderson
Attorney, Agent, or Firm—Edward J. Sites

[57] ABSTRACT

Hot melt polyamide adhesive compositions are disclosed which exhibit long open assembly times. The polyamides are the condensation products of an acid component consisting essentially of a polymeric fatty acid and a dicarboxylic acid, and an amine component consisting essentially of a cyclic diamine, a non-cyclic aliphatic diamine and, optionally, additional organic diamines.

23 Claims, No Drawings

LONG OPEN ASSEMBLY TIME VINYL-BONDING POLYAMIDE FROM DIMER ACID

BACKGROUND OF THE INVENTION

This invention relates to polyamide compositions useful as hot-melt adhesives.

One important property of adhesive compositions is their "open assembly time" or "open time". Open time is the maximum time a hot melt coated surface may be allowed to cool before bonding and still retain satisfactory adhesion. The open time required of a polyamide adhesive depends on the specific applications and can vary, for commercially available polyamide adhesives, from less than five seconds to about fifty-five seconds.

There are many disclosures in the art relating to polyamide compositions having hot-melt adhesive properties and the methods for preparing such compositions. A poly(ester-amide) adhesive composition having a long open assembly time is disclosed in U.S. Pat. No. 4,485,233. This patent disclosed poly(ester-amide) adhesive compositions comprising the product of polymerization of (a) from 10 to 60 equivalent percent of a polymeric fatty acid, and (b) from 40 to 90 equivalent percent of a dicarboxylic acid, with a substantially equivalent amount of (c) from 40 to 90 equivalent percent of an organic diamine and (d) from 10 to 60 equivalent percent of a diol. The organic diamine component (c) may comprise a linear aliphatic, cycloaliphatic or aromatic diamine, and, disclosed as the preferred diamines, are piperazine, 1,3-dipiperidyl propane and diamines with an odd number of carbon atoms such as 1,3-diaminopropane.

Representative of other prior art adhesive compositions are those described in U.S. Pat. Nos. 3,377,303 and 3,444,026. The latter compositions comprise the reaction product of a dimer fatty acid and a wide variety of diamines. Copolymerizing dicarboxylic acids, including aliphatic dicarboxylic acids such as adipic, sebacic and azelaic acids, are also disclosed as components of the adhesive compositions.

Polyamide compositions useful as hot-melt adhesives for adhering vinyl plastics are also disclosed in U.S. Pat. No. 3,847,875. The latter compositions are the reaction product of 1,8 or 1,9-heptadecane dicarboxylic acid and specific heterocyclic diamines such as piperazine. Copolymerizable dicarboxylic acids such as azelaic, sebacic and adipic acids are also disclosed as components of the adhesives.

It has been extremely difficult to obtain an adhesive formulation capable of exhibiting both a long open time and excellent ultimate bond strength. Generally, adhesives exhibiting long open time have not exhibited high bond strengths, and adhesives exhibiting high bond strengths have not exhibited long open times. It is, therefore, a goal of those skilled in the art to obtain an adhesive formulation which exhibits long open time and which also preferably exhibits excellent bond strength.

SUMMARY OF THE INVENTION

It has now surprisingly been found that polyamide adhesive compositions which exhibit both long open assembly times and a slow decrease in bonding strength with increasing assembly time can be prepared by incorporating into such polyamides one or more non-cyclic diamines in which the amine groups are bonded to odd-numbered carbon atoms. More specifically, the novel compositions of this invention comprise the condensation product of substantially equimolar quantities of:

(a) an acid component consisting essentially of one or more polymeric fatty acids and one or more dicarboxylic acids, and (b) an amine component consisting essentially of (i) one or more cyclic aliphatic diamines, (ii) one or more non-cyclic aliphatic diamines in which the amine groups are bonded to odd-numbered carbon atoms on the aliphatic chain, and, optionally, (iii) one or more additional organic diamines.

DETAILED DESCRIPTION OF THE INVENTION

The components of the polyamide compositions of this invention are all well known in the art, as are methods for preparing them. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % By Weight |
| --- | --- |
| $C_{18}$ monobasic acids (monomer) | 0–10 |
| $C_{36}$ dibasic acids (dimer) | 60–95 |
| $C_{54}$ and higher polybasic acids (trimer) | 1–35 |

The relative ratios of monomer, dimer and trimer in unfractionated polymeric fatty acids are dependent on the nature of the starting material and the conditions of polymerization. Methods for the polymerization of fatty acids are described, for example, in U.S. Pat. No. 3,157,681.

A wide variety of dicarboxylic acids may also be employed together with the polymeric fatty acids in the preparation of the compositions of the invention. These include aliphatic, cycloaliphatic and aromatic dicarboxylic acids. Representative of such acids, which may contain from 2 to 20 carbon atoms, are oxalic, glutaric, malonic, adipic, succinic, azelaic, sebacic, dodecanedioic and pimelic. Methods of preparing these preferred acids are well known, and they are readily available commercially. Preferred dicarboxylic acids employed in this invention are straight chain aliphatic diacids having at least six carbon atoms and, more preferably, six to twelve carbon atoms, such as azelaic and sebacic acids, which are most preferred. It should be understood that use of the corresponding acid anhydrides, esters and acid chlorides of thee acids is included in the term "dicaboxylic acid".

The ratio of equivalents polymeric fatty acid to equivalents dicarboxylic acid in the acid component is preferably within the range of about 20:80 to 80:20, and more preferably within the range of about 30:70 to 40:60.

The use of an amine component which comprises at least partially a cyclic aliphatic diamine and at least partially a non-cyclic aliphatic diamine as defined above is a feature which distinguishes the polyamides of this invention over those known in the art and which, tests indicate, lends to these compositions their long open assembly times. The cyclic aliphatic diamines which may be used in this invention may be homocyclic such as, for example, 2,2-bis-(4-aminocyclohexyl) (4', 4'-cyclohexylamine)propane, isophorone diamine, and cyclohexanebis-(methylamines), or may preferably be heterocyclic, such as piperazine or 1,3-dipiperidyl propane.

The non-cyclic aliphatic diamines which form component (ii) of the amine component are non-cyclic diamines in which the amine groups are bonded to odd-numbered carbon atoms on the aliphatic chain. Thus, for example, diamines with amine groups located at positions 1,3, 1,5, 1,7, and 1,9, to name just a few examples, would be included. There is no limit on the number of carbon atoms in the aliphatic diamine other than availability; generally such diamines having from three to nine carbon atoms are available. Specific examples of suitable diamines include 5-methyl-1,9-nonanediamine and the preferred diamines, 1,3 diaminopropane, 2-methyl-1,5-pentanediamine (e.g., Dytel A (R), available from Du Pont Company, Wilmington, Delaware), and 1,5-diaminopentane.

The organic diamines which optionally form the third component of the overall amine component may be one or more of the linear aliphatic, cycloaliphatic or aromatic diamines having from about 2 to 20 carbon atoms. Preferred especially are the alkylene diamines. Illustrative of the preferred diamines are ethylene diamine, 1,4-diaminobutane diamine, and 1,6-hexamethylene diamine. Also preferred are dimer diamines such as Humco DP-3695 and the polyglycol diamines such as Jeffamine Registered TM D-2000 available from Texaco and Polyglycol diamine H-221 available from Union Carbide Corporation. Tests indicate that the incorporation of from about 1 to 20% equivalents, based on total equivalents amine component, of polyglycol diamine can improve the low temperature impact resistance of the compositions.

The relative equivalent amounts of cyclic diamine (i) and non-cyclic aliphatic diamine (ii) in the overall amine component of the polyamide can be varied to achieve a polyamide with the desired long open assembly time, e.g., at least 45 seconds when measured as described below. For example, the greater the quantity of non-cyclic aliphatic diamine used, the lesser the quantity of cyclic diamine is desired. Generally speaking, the amine component comprises about 25 to 75% equivalents of cyclic diamine (i) and about 1 to 45% equivalents of noncyclic aliphatic diamine (ii). Preferably, the amine component also comprises about 10 to 70% equivalents of organic diamine (iii) which is preferably ethylene diamine.

The preferred polyamide compositions of this invention comprise:

I. Acid component
30–40% equivalents polymeric fatty acid
70–60% equivalents dicarboxylic acid selected from azelaic acid, sebacic acid, dodecanedioic acid and mixtures thereof II. Amine component
45–60% equivalents piperazine
5–25% equivalents 2-methyl-1,5-pentanediamine or 1,5-diaminopentane
10–40% equivalents ethylene diamine.

The relative quantities of acid and amine components are selected so that substantially equivalent numbers of reactive carboxyl and amine groups are present in the reaction mixture to produce a neutral or balanced polyamide, i.e., the acid an amine numbers are substantially equal. Slight excesses of carboxyl or amine are acceptable, however, and the term "substantially equimolar" as used herein to refer to the relative quantities of acid and amines is intended to encompass such excesses. The ratio of carboxyl to amine or amine to carboxyl is preferably maintained between 0.9:1 and 1.1:1 so that acid and amine numbers will be less than 35, and preferably less than 20. Amine and acid numbers may be measured by conventional titrametric analytical techniques and are usually given as milligrams of potassium hydroxide per gram of product.

The techniques and general method of polymerizing the mixed reactants is generally well known; see, for example, U.S. Pat. Nos. 3,377,303 and 4,343,743. In general, the polyamides of this invention may be prepared by charging a resin kettle with the reactants, in proportions as hereinabove described, and heating the mixture to a temperature at which random polymerization occurs. In general, the reactants are heated to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid. The heating of the reaction mixtures may be carried out until a selected viscosity of the reaction mixture is reached, e.g., 500–100,000 cps at 190° C., and preferably 2500–25,000 cps at 190° C. In addition, small amounts (0.5 to 10 eq. %) of a saturated linear carboxylic acid containing 5–20 carbons such as, for example, stearic and palmitic acid, or other reactive monomers such as phenyl benzoate or triphenylphosphite may be added to the mixture to control molecular weight and viscosity.

The hot-melt polyamide compositions of the present invention are advantageous for their adhesive strengths in adhering to vinyl resins such as plasticized poly(vinyl chloride). However, the compositions of the invention also can be used to bond both rigid or flexible, natural or synthetic material. They may be employed to adhere leather, suede, and both woven and nonwoven fabrics obtained from cotton, wool, silk, sisal, hemp, jute, rayon and synthetic fibers such as nylons, acrylics, polyesters, polyolefins and the like. They are also useful with natural rubber, polyurethanes, neoprene, styrene-butadiene copolymers, butadiene, ABS and other polymeric materials. The present resin compositions are similarly useful for hot melt bonding rigid materials such as metals, including aluminum, steel, wood, paper products, phenolics, cork, pressboard, glass and the like.

The polyamide resins are applied using conventional hot-melt application procedures such as spraying, printing dipping, spreading, rolling and the like, and the film thickness can range from less than one mil up to fifty mils. While for most constructions the resin is applied to only one side of the substrate, it may be applied to both sides in order to form a sandwich-type construction. The polyamides of this invention may also be blended with other polyamide and polyester adhesive resins to obtain a wide variety of additional compositions useful for hot-melt bonding. The present polyamides may constitute as little as 0.5 weight percent of the total resins or, if other resins or additives are added thereto, can constitute as much as 99.9 weight percent of the total composition.

For the purpose of this invention, the open assembly time for an adhesive composition may be measured using the test method described in ASTM Draft No. 1, Nov. 3, 1978, entitled, "Proposed Standard Test Procedure for Determining the Open Times of Hot Melt Adhesives", the disclosure of which is hereby incorporated by reference. Briefly, this test requires that film of the adhesive be cast while in the molten state onto kraft paper. Paper strips are then placed on the adhesive film at five second intervals, and the resulting composite is allowed to stand at ambient conditions for a period of time. The paper strips are then peeled away, and the time at which a 50 percent fiber tear is observed is denoted as the open assembly time of the adhesive. The compositions of this invention are illustrated in the following examples which are deemed to be exemplary only and are not intended to limit the scope of the invention. The compositions in these examples were made by the general procedure outlined above. In these examples, the following tests were used:

Softening Point, Ring and Ball ASTM E-28
Viscosity @ 190° C., ASTM D-1084-63, Method B
Tensile Strength, ASTM D-1708
Elongation, ASTM D-1708
Modulus, ASTM D-638 Type IV Specimens
Vinyl T-Peel, ASTM D-1876-72 @ 20° C.
Low Temperature Impact, ASTM D-746
Open Time, as described above In the examples, the following abbreviations are also used:

EDA = ethylene diamine
MPMD = 2-methyl-1,5-pentanediamine
HMDA = 1,6-hexamethylenediamine

EXAMPLES 1 AND 2 AND COMPARATIVE EXAMPLES A AND B

Table 1 shows the compositions and properties of a number of adhesive compositions according to this invention. In particular, a comparison of compositions with and without the aliphatic diamine with amine groups on odd-number carbon atoms is presented. The % equivalents expressed in the table and in following tables are, for acids, % equivalents based on total equivalents acid, and, for amines, % equivalents based on total equivalents amine.

TABLE 1

| | % Equivalents | | | |
|---|---|---|---|---|
| | Ex. 1 | Ex. A | Ex. 2 | Ex. B |
| Components | | | | |
| Polymeric Fatty Acid* | 35.00 | 35.00 | 35.00 | 70.98 |
| Azelaic Acid | 65.00 | 65.00 | 65.00 | 29.02 |
| EDA | 23.63 | 23.63 | 23.63 | 45.93 |
| Piperazine | 54.34 | 54.34 | 54.34 | 52.57 |
| MPMD | 18.75 | — | — | — |
| HMDA | — | 18.75 | — | — |
| 1,5-Diaminopentane | — | — | 18.75 | — |
| Physical Properties | | | | |
| Softening Point, °C. | 138 | 140.5 | 139.5 | 138 |
| Viscosity @ 190° C., cps | 8790 | 8000 | 7100 | 9000 |
| Acid Number | 13.2 | 13.9 | 14.2 | 10 |
| Amine Number | 0.4 | 0.8 | 0.8 | 0.6 |
| Tensile Strength, psi | 1050 | 700 | 800 | 800 |
| Elongation, % | 510 | 430 | 520 | 800 |
| Modulus, psi | 8944 | 6200 | 11100 | 10000 |
| Vinyl T-Peel, pli | 35 | 27 | 33 | 30 |
| Open Assembly Time, sec. | 300 | 75 | 570 | 40 |

*Unidyme-14, available from Union Camp Corporation, Wayne, NJ, having the composition: monomer 0.4 wt. %, dimer 95.6 wt. %, trimer and high polymer 4.0 wt. %.

It can be seen from the test results presented in Table 1 that incorporation of a noncylcic diamine with amine groups bonded to odd-numbered carbon atoms (Ex. 1 and 2) dramatically increases the long open assembly time of the polyamide in comparison to a polyamide incorporating a diamine with one amine group bonded to an even-numbered carbon atom (Ex. B).

EXAMPLES 3-7

Polyamides incorporating varying amounts of noncyclic aliphatic diamine (MPMD) were prepared and tested to illustrate the effect which the presence of that component has on the long open assembly time of the polyamide. The compositions and test results are presented in Table 2.

TABLE 2

| | Ex. 3 | Ex. 4 | Ex. 5 | Ex. 6 | Ex. 7 |
|---|---|---|---|---|---|
| Components | | | | | |
| Dimer 14 | 65.00 | 55.00 | 35.00 | 35.00 | 25.00 |
| Azelaic Acid | 35.00 | 45.00 | 65.00 | 65.00 | 75.00 |
| EDA | 37.51 | 32.48 | 23.63 | 17.38 | — |
| Piperazine | 53.70 | 53.61 | 54.34 | 54.34 | 54.00 |
| MPMD | 4.97 | 9.93 | 18.75 | 25.00 | 42.22 |
| Physical Properties | | | | | |
| Soft. Pt., °C. | 140 | 141 | 138 | 119 | 96.5 |
| Visc. @ 190° C., cps | 7500 | 7100 | 8790 | 7600 | 10780 |
| Tens. Strgth, psi | 525 | 600 | 1050 | 290 | 60 |
| Elongation, % | 600 | 500 | 510 | 770 | 900 |
| Modulus, psi | 6200 | 7900 | 8944 | 3700 | 700 |
| Vinyl T Peel, pli | 33 | 30 | 35 | 28 | 40 |
| Open Assem. Time, sec. | 55 | 60 | 300 | 465 | 24 hrs |

EXAMPLES 8-11

Polyamide compositions in which the amount of cyclic diamine was varied were prepared and tested, with the results being presented in Table 3.

TABLE 3

| | % Equivalents | | | |
|---|---|---|---|---|
| | Ex. 8 | Ex. 9 | Ex. 10 | Ex. 11 |
| Components | | | | |
| Dimer acid | 35.00 | 35.00 | 35.00 | 35.00 |
| Azelaic acid | 65.00 | 65.00 | 65.00 | 65.00 |
| EDA | 26.51 | 21.51 | 17.38 | 11.72 |
| Piperazine | 45.37 | 50.37 | 54.34 | 60.00 |
| MPMD | 25.00 | 25.19 | 25.00 | 25.00 |
| Physical Properties | | | | |
| Softening Point, °C. | 141.0 | 128 | 119 | 105.5 |
| Viscosity @ 190° C., cps | 10900 | 9400 | 7600 | 11200 |
| Tensile Strength, psi | 1300 | 750 | 290 | 60 |
| Elongation, % | 510 | 570 | 770 | 2800 |
| Modulus, psi | 13700 | 6200 | 3700 | 1100 |
| Vinyl T Peel, pli | 24 | 27 | 28 | 35 |
| Open Assembly Time, sec. | 480 | 615 | 465 | 360 |

EXAMPLES 12 AND 13

Polyamides according to this invention were prepared with and without incorporation of a small amount of polyglycol diamine, Jeffamine, Reg. TM D-2000, available from Texaco Chemical Co. These compositions and their properties are presented in Table 4. The data in Table 4 indicate that the addition of a small amount of polyglycol diamine improves the low temperature impact resistance of the composition.

TABLE 4

| | % Equivalents | |
|---|---|---|
| | Ex. 12 | Ex. 13 |
| Component | | |
| Dimer acid | 55.00 | 35.00 |
| Azelaic acid | 45.00 | 65.00 |
| EDA | 32.48 | 18.48 |
| Piperazine | 53.61 | 53.91 |
| MPMD | 9.93 | 18.60 |

TABLE 4-continued

| | % Equivalents | |
| --- | --- | --- |
| | Ex. 12 | Ex. 13 |
| Polyglycol diamine | — | 4.96 |
| Physical Properties | | |
| Softening Point, °C. | 141 | 127 |
| Viscosity, 190° C. | 7100 | 7150 |
| Tensile Strength, psi | 600 | 250 |
| Elongation, % | 500 | 230 |
| Modulus, psi | 7900 | 3600 |
| Vinyl T-Peel, pli | 30 | 35 |
| Open Time, sec. | 60 | 630 |
| Low Temperature | | |
| Impact Test −15° C. | 0 | 80 |
| % Passed −20° C. | 0 | 40 |

What is claimed is:

1. A polyamide hot melt adhesive composition having a long open assembly time of at least 45 seconds, which comprises the polyamide condensation product of substantially equimolar quantities of:
   (a) an acid component consisting essentially of one or more polymeric fatty acids and one or more dicarboxylic acids, and
   (b) an amine component consiting essentially of (i) one or more cyclic aliphatic diamines, (ii) one or more non-cyclic aliphatic diamines in which the amine groups are bonded to odd-numbered carbon atoms on the aliphatic chain, and (iii) one or more alkylene diamines, with or without (iv) one or more polyglycol diamines.

2. A polyamide composition according to claim 1 where the ratio of equivalents of polymeric fatty acid(s) to equivalents of dicarboxylic acid(s) is in the range of about 20:80 to 80:20.

3. A polyamide composition according to claim 2 where the ratio of equivalents of polymeric fatty acid(s) to equivalents of dicarboxylic acid(s) is in the range of about 30:70 to 40:60.

4. A polyamide composition according to claim 1 where the polymeric fatty acid is dimer 14, dimer fatty acid.

5. A polyamide composition according to claim 1 where the dicarboxylic acid is a straight chain aliphatic acid having at least six carbon atoms.

6. A polyamide composition according to claim 5 where the dicarboxylic acid is selected from the group consisting of azelaic acid, sebacic, dodecanedioic acid and mixtures thereof.

7. A polyamide composition accoring to claim 1 where the cyclic aliphatic diamine is piperazine.

8. A polyamide composition according to claim 1 where the non-cyclic aliphatic diamine (ii) is selected from 2-methyl-1,5-pentadiamine, 1,5-diaminopentane or mixtures thereof.

9. A polyamide composition according to claim 1 where the amine component comprises about 25 and 75% equivalents of cyclic diamine (i), about 1 to 45% equivalents of noncyclic aliphatic diamine (ii), and about 10 to 70% equivalents of alkylene diamine (iii).

10. A polyamide composition according to claim 9 where the percent equivalents of cyclic aliphatic diamine, based on total equivalents amine component, is in the range of about 45 to 60%.

11. A polyamide composition according to claim 1 where the percent equivalents of non-cyclic aliphatic diamine (ii), based on total equivalents of amine component, is in the range of about 5 to 25%.

12. A polyamide composition according to claim 1 in which amine component (iii) comprises ethylene diamine.

13. A polyamide composition according to claim 12 where the percent equivalents of ethylene diamine, based on total equivalents amine component, is in the range of about 10 to 40%.

14. A hot-melt adhesive polyamide composition which comprises the polyamide condensation product of substantially equimolar quantities of:
   (a) an acid component consisting essentially of one or more polymeric fatty acids and one or more dicarboxylic acids, and
   (b) an amine component consisting essentially of (i) about 25 to 75% equivalents, based on total equivalents amine component, of one or more cyclic aliphatic diamines, (ii) about 1 to 45% equivalents, based on total equivalents amine component, of one or more non-cyclic aliphatic diamines in which the amine groups are bonded to odd-numbered carbon atoms on the aliphatic chain, and (iii) the balance of one or more alkylene diamines, with or without (iv) one or more polyglycol diamines.

15. A polyamide composition according to claim 14 where the ratio of equivalents of polymeric fatty acid(s) to equivalents of dicarboxylic acid(s) is in the range of about 20:80 to 80:20.

16. A polyamide composition according to claim 15 where the ratio of equivalents of polymeric fatty acids(s) to equivalents of dicarboxylic acid(s) is in the range of about 30:70 to 40:60.

17. A polyamide composition according to claim 14 where the polymeric fatty acid is dimer 14, dimer fatty acid.

18. A polyamide composition according to claim 15 where the dicarboxylic acid is a straight chain aliphatic acid having at least six carbon atoms.

19. A polyamide composition according to claim 18 where the dicarboxylic acid is selected from the group consisting of azelaic acid, sebacic acid, dodecanedioic acid and mixtures thereof.

20. A polyamide composition according to claim 14 where the cyclic aliphatic diamine is piperazine.

21. A polyamide composition according to claim 14 where the non-cyclic aliphatic diamine (ii) is selected from 2-methyl-1,5-pentadiamine, 1,5-diaminopentane or mixtures thereof.

22. A polyamide composition according to claim 14 where
   (a) the acid component consists essentially of about 30–40% equivalents polymeric fatty acid and 70–60% equivalents dicarboxylic acid selected from azelaic acid, sebacic acid, dodecanedioic acid or mixtures thereof, and
   (b) the amine component consists essentially of (i) about 45–60% equivalents piperazine, (ii) about 5–25% equivalents of diamine selected from 2-methyl-1,5-pentanediamine, 1,5-diaminopentane or mixtures thereof, and (iii) about 10–40% equivalents ethylene diamine.

23. A polyamide composition according to claim 22 in which amine component (b) additionally contains about 1 to 20% equivalents polyglycol diamine.

* * * * *